(12) United States Patent
Gwak et al.

(10) Patent No.: US 9,635,247 B2
(45) Date of Patent: Apr. 25, 2017

(54) METHOD OF DISPLAYING A PHOTOGRAPHING MODE BY USING LENS CHARACTERISTICS, COMPUTER-READABLE STORAGE MEDIUM OF RECORDING THE METHOD AND AN ELECTRONIC APPARATUS

(71) Applicant: SAMSUNG ELECTRONICS CO., LTD., Suwon-si, Gyeonggi-do (KR)

(72) Inventors: Jin-pyo Gwak, Seoul (KR); Su-kyung Kim, Seoul (KR); Hyun-ock Yim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/547,699

(22) Filed: Nov. 19, 2014

(65) Prior Publication Data

US 2015/0189167 A1 Jul. 2, 2015

(30) Foreign Application Priority Data

Dec. 31, 2013 (KR) ........................ 10-2013-0169407

(51) Int. Cl.
*H04N 5/228* (2006.01)
*H04N 5/232* (2006.01)
*G06K 9/00* (2006.01)

(52) U.S. Cl.
CPC ..... *H04N 5/23222* (2013.01); *G06K 9/00624* (2013.01); *H04N 5/23209* (2013.01); *H04N 5/23245* (2013.01); *H04N 5/23293* (2013.01)

(58) Field of Classification Search
USPC ..................................................... 348/222.1
See application file for complete search history.

(56) References Cited

U.S. PATENT DOCUMENTS

| 5,051,776 | A | 9/1991 | Mancino |
| 5,710,948 | A | 1/1998 | Takagi |
| 5,811,754 | A | 9/1998 | Nakatani et al. |
| 6,089,715 | A | 7/2000 | Hoover et al. |
| 6,847,336 | B1 | 1/2005 | Lemelson et al. |
| 6,961,707 | B2 | 11/2005 | Jenkins |
| 7,376,346 | B2 | 5/2008 | Merola et al. |

(Continued)

FOREIGN PATENT DOCUMENTS

| EP | 2 423 742 A1 | 2/2012 |
| JP | 2007-184733 A | 7/2007 |
| KR | 10-2012-0022050 A | 3/2012 |

OTHER PUBLICATIONS

Extended European Search Report issued for EP 14200150.2 (May 7, 2015).

*Primary Examiner* — Stephen Coleman
(74) *Attorney, Agent, or Firm* — Drinker Biddle & Reath LLP

(57) ABSTRACT

A method of displaying a photographing mode is provided. The method includes: generating input images; determining scene information by recognizing scenes in the input images; obtaining lens information related to a lens of an electronic apparatus; determining setup information by using the scene information and the lens information; searching for a photographing mode of the electronic apparatus based on the setup information; and displaying a found photographing mode on a display unit of the electronic apparatus.

6 Claims, 7 Drawing Sheets

(56) References Cited

U.S. PATENT DOCUMENTS

| | | |
|---|---|---|
| 7,561,748 B2 | 7/2009 | Suzuki |
| 7,623,295 B2 | 11/2009 | Sabeta |
| 7,634,115 B2 | 12/2009 | Ryu |
| 7,764,844 B2 | 7/2010 | Bouk et al. |
| 7,840,084 B2 | 11/2010 | Bouk et al. |
| 7,869,058 B2 | 1/2011 | Restaino et al. |
| 8,270,729 B2 | 9/2012 | Saijo et al. |
| 8,395,668 B2 | 3/2013 | Solomon |
| 8,472,662 B2 | 6/2013 | Muriello et al. |
| 8,488,040 B2 | 7/2013 | Chen et al. |
| 8,515,271 B2 | 8/2013 | Tanaka |
| 2007/0153111 A1 | 7/2007 | Kato |
| 2010/0020220 A1* | 1/2010 | Sugita ............... H04N 5/23219 348/333.01 |
| 2010/0123815 A1 | 5/2010 | Yim et al. |
| 2010/0194931 A1 | 8/2010 | Kawaguchi et al. |
| 2011/0317026 A1* | 12/2011 | Shibazaki ............... G06T 7/408 348/222.1 |
| 2012/0051727 A1* | 3/2012 | Tanaka ........................ 396/49 |

* cited by examiner

METHOD OF DISPLAYING A PHOTOGRAPHING MODE BY USING LENS CHARACTERISTICS, COMPUTER-READABLE STORAGE MEDIUM OF RECORDING THE METHOD AND AN ELECTRONIC APPARATUS

RELATED APPLICATION

This application claims the priority benefit of Korean Patent Application No. 10-2013-0169407, filed on Dec. 31, 2013, in the Korean Intellectual Property Office, the disclosure of which is incorporated herein in its entirety by reference.

BACKGROUND

1. Field

One or more embodiments of the present disclosure relate to a method of displaying a photographing mode based on lens characteristics, a computer-readable storage medium recording the method and an electronic apparatus.

2. Related Art

In digital photographing apparatuses taking static images or moving images, a variety of scene modes are installed in which settings that are appropriate for photographing a subject are determined. Examples of the scene modes are a self-portrait mode, a landscape mode, a close-up mode, a sports mode, a commemorative photo mode, a candle mode, or the like. These scene modes have predetermined setup values used for controlling resolution of images such as a shutter speed, an aperture effect, a handshake prevention effect, color reproduction features, etc. A user discretionally selects a scene from various scenes according to a photographing condition and may be able to capture images of the selected scene based on optimal settings for the scene.

SUMMARY

One or more embodiments of the present disclosure include a method of displaying a photographing mode based on a subject's condition and features of a lens by using scene information that is determined by recognizing scenes in input images generated by an electronic apparatus and lens information indicating the features of the lens included in the electronic apparatus.

Additional features will be set forth in part in the description which follows and, in part, will be apparent from the description, or may be learned by practice of the presented embodiments.

According to one or more embodiments of the present disclosure, a method of displaying a photographing mode includes: generating input images; determining scene information by recognizing scenes in the input images; obtaining lens information related to a lens of an electronic apparatus; determining setup information by using the scene information and the lens information; searching for a photographing mode of the electronic apparatus based on the setup information; and displaying a selected photographing mode based on the search on a display unit of the electronic apparatus.

The lens information may include at least one of aperture information, focal distance information, information about whether three-dimensional (3D) images are taken, aperture shape information, or distortion correction information.

The determining of the setup information may include determining setup lists with regard to photographing conditions and setup values corresponding to the setup lists by using the scene information and the lens information.

The photographing conditions may include at least one of white balance, exposure value compensation (EVC), color correction, flash amount adjustment, sensitivity adjustment, aperture adjustment, or shutter speed adjustment.

The searching for the photographing mode may include searching for a photographing mode comprising the setup information.

The displaying of the selected photographing mode on the display unit may further include displaying at least one photographing mode selectable by a user together with the input images.

According to one or more embodiments, an electronic apparatus includes: an image generation unit that generates input images; a scene information determination unit that determines scene information by recognizing scenes in the input images; a lens information obtaining unit that obtains lens information about a lens; a setup information determination unit that determines setup information by using the scene information and the lens information; a photographing mode search unit that searches for a photographing mode of the electronic apparatus based on the setup information; and a display unit that displays a selected photographing mode.

The lens information may include at least one of aperture information, focal distance information, information about whether three-dimensional (3D) images are taken, aperture shape information, or distortion correction information.

The setup information determination unit may determine setup lists with regard to photographing conditions and setup values corresponding to the setup lists by using the scene information and the lens information.

The photographing conditions may include at least one of white balance, exposure value compensation (EVC), color correction, flash amount adjustment, sensitivity adjustment, aperture adjustment, or shutter speed adjustment.

The photographing mode search unit may search for a photographing mode including the setup information.

The display unit may display at least one photographing mode selectable by a user together with the input images.

According to one or more embodiments, a non-transitory computer-readable storage medium having written thereon computer program codes, which when executed by a processor, performs a method of displaying a photographing mode, the method including: generating input images; determining scene information by recognizing scenes in the input images; obtaining lens information related to a lens of an electronic apparatus; determining setup information by using the scene information and the lens information; searching for a photographing mode of the electronic apparatus based on the setup information; and displaying a selected photographing mode based on the search on a display unit of the electronic apparatus.

The lens information may include at least one of aperture information, focal distance information, information about whether three-dimensional (3D) images are taken, aperture shape information, or distortion correction information.

The determining of the setup information may include determining setup lists with regard to photographing conditions and setup values corresponding to the setup lists by using the scene information and the lens information.

The photographing conditions may include at least one of white balance, exposure value compensation (EVC), color correction, flash amount adjustment, sensitivity adjustment, aperture adjustment, or shutter speed adjustment.

The searching for the photographing mode may include searching for a photographing mode comprising the setup information.

The displaying of the selected photographing mode on the display unit may further include displaying at least one photographing mode selectable by a user together with the input images.

BRIEF DESCRIPTION OF THE DRAWINGS

These and/or other embodiments will become apparent and more readily appreciated from the following description of various embodiments, taken in conjunction with the accompanying drawings in which.

DETAILED DESCRIPTION

Figure 1:
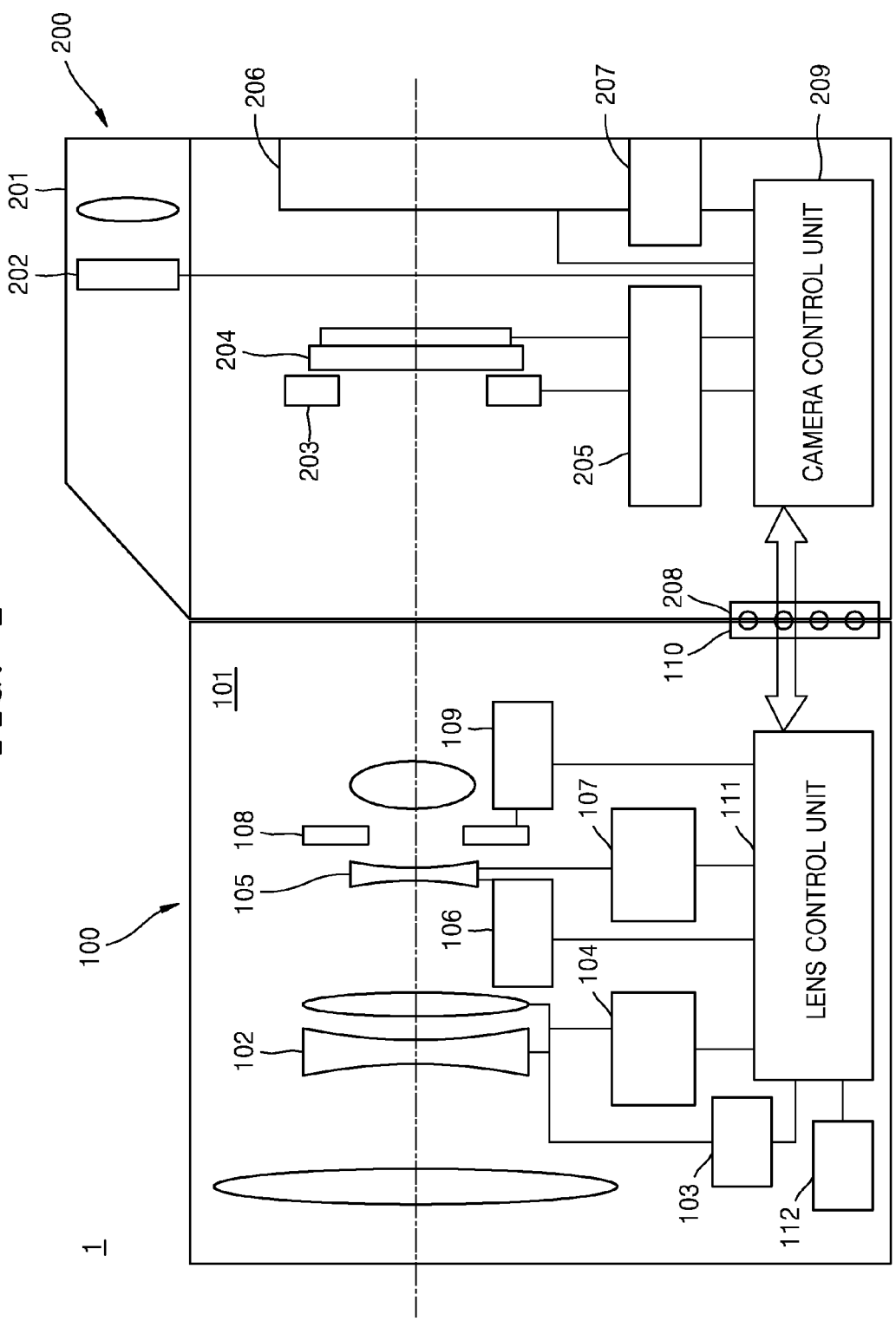
FIG. 1 is a diagram of an electronic apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of", when preceding a list of elements, modify the entire list of elements and do not modify the individual elements of the list.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

Hereinafter, the present invention will be described in detail by explaining exemplary embodiments of the invention with reference to the attached drawings. Like reference numerals in the drawings denote like elements, and repeated descriptions will be omitted.

FIG. 1 is a view of an electronic apparatus 1 according to an embodiment. Examples of the electronic apparatus 1 may include apparatuses capable of capturing, storing and managing digital images, such as a digital photographing apparatus, a digital camera, a mobile phone, a smartphone, a laptop computer, a tablet PC, an e-book device, a digital broadcasting terminal, a personal digital assistant (PDA), a portable multimedia player, etc.

As illustrated in FIG. 1, the electronic apparatus 1 includes an interchangeable lens 100 and a main body 200. Hereinafter, each component will be explained in detail.

The interchangeable lens 100 provides a focus detection function, and the main body 200 provides functions that drive a zoom lens 102, a focus lens 105, and an aperture 108 by controlling the interchangeable lens 100.

The interchangeable lens 100 (hereinafter, referred to as 'lens') includes an image-forming optical system 101, a zoom lens driving actuator 103, a zoom lens location detection sensor 104, a focus lens driving actuator 106, a focus lens location detection sensor 107, an aperture driving actuator 109, a lens mount 110, a lens control unit 111, and a lens manipulation unit 112.

The image-forming optical system 101 includes the zoom lens 102 for adjusting zoom, the focus lens 105 for changing a focal position, and the aperture 108. The zoom lens 102 and the focus lens 105 may include a group of lenses in which lenses are arranged.

The zoom lens location detection sensor 104 and the focus lens location detection sensor 107 detect locations of the zoom lens 102 and the focus lens 105, respectively. A time when the location of the focus lens 105 is detected may be set by the lens control unit 111 or a camera control unit 209 to be explained later. For example, the time when the location of the focus lens 105 is detected may be a time when auto focus (AF) is detected from image data.

The zoom lens driving actuator 103, the focus lens driving actuator 106, and the aperture driving actuator 109 are controlled by the lens control unit 111 and drive the zoom lens 102, the focus lens 105, and the aperture 108, respectively.

The lens control unit 111 controls overall operations of elements included in the lens 100. The lens control unit 111 detects lens information about lenses and transmits the detected lens information. For example, the lens information includes at least one of aperture information, focal distance information, information about whether three-dimensional (3D) images are taken, aperture shape information, and distortion correction information.

However, the lens information is not limited thereto.

The lens control unit 111 may transmit the lens information to the main body 200 in a case where the electronic apparatus 1 is turned on, or there is a change in the lens 100 that is separable from the main body 200, or in a case where the camera control unit 209 requests for the lens information of the lens 100.

The lens mount 110 includes communication pins on a lens side, and the communication pins on the lens side are used as a transmission path of data, control signals, etc. by being connected with communication pins on a camera side which will be explained later.

The lens manipulation unit 112 is a manipulation unit for performing power zoom lens manipulation, power focus lens manipulation, or the like. The lens manipulation unit 112 is connected to the lens control unit 111 and transmits manipulation signals, generated based on a user's input, to the lens control unit 111.

Hereinafter, a structure of the main body 200 will be explained.

The main body 200 may include an electronic view finder (EVF) 201, a shutter 203, an imaging device 204, an imaging device control unit 205, a display unit 206, a user input unit 207, the camera control unit 209, and a camera mount 208.

The EVF 201 may have a liquid crystal display unit 202 and may display images, which are being taken, in real time (e.g., a live-view display).

The shutter 203 determines a time during which light is incident on the imaging device 204, that is, an exposure time.

The imaging device 204 receives optical light passing through the image-forming optical system 101 of the lens 100 and generates image data. The imaging device 204 may include photoelectric conversion units (not shown) arranged in a matrix form and vertical and/or horizontal transmission paths that read the image data by moving charges from the photoelectric conversion units. The imaging device 204 may be a charge-coupled device (CCD) sensor, a complementary metal oxide semiconductor (CMOS) sensor, or the like.

The imaging device control unit 205 generates timing signals and allows the imaging device 204 (which is synchronized with the timing signals) to capture images. In addition, the imaging device control unit 205 sequentially reads horizontal image data after the charges accumulate in each scanning line. The read horizontal image data is used for detecting autofocus (AF) in the camera control unit 209.

The display unit 206 displays various images and information.

For example, the display unit 206 may include at least one of a liquid crystal display (LCD), a thin film transistor-liquid crystal display (TFTLCD), an organic light-emitting diode (OLED) display, a flexible display, or a 3D display.

Also, when the display unit 206 and a touch pad are combined into a touch screen, the display unit 206 may be used as an output device as well as an input device.

The user input unit 207 is a unit that inputs commands from the user in order to manipulate the electronic apparatus 1. The user input unit 207 may include various buttons such as a shutter release button, a main switch, a mode dial, or a menu button. Moreover, the user input unit 207 may include a key pad, a dome switch, a touch pad (a touch capacitive-type touch pad, a pressure resistive-type touch pad, an infrared beam sensing-type touch pad, a surface acoustic wave-type touch pad, an integral strain gauge-type touch pad, a piezoelectric effect-type touch pad, or the like), a jog wheel, a jog switch, etc.

Figure 2:
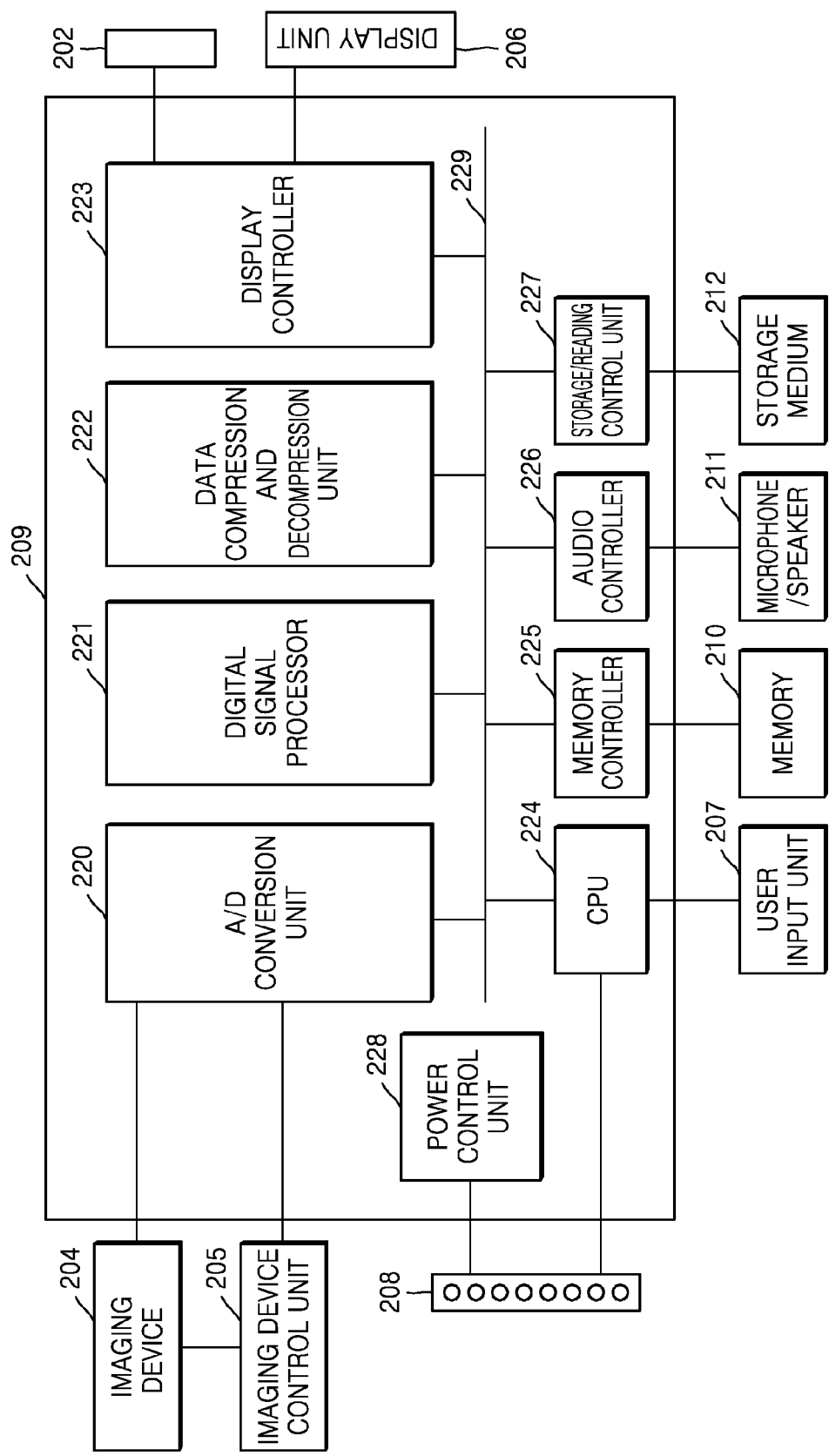
FIG. 2 is a block diagram of a camera control unit of the electronic apparatus of FIG. 1, according to an embodiment.

In this case, the user input unit 207 detects touch gestures of the user on the touch screen by using a touch screen module (not shown) stored in a memory 210 (FIG. 2) and may transmit information about the touch gestures to a central processing unit (CPU) 224 (FIG. 2). The touch screen module may be a separate controller (hardware).

The camera control unit 209 may transmit commands for driving the shutter 203, the aperture 108, etc. according to a received request for shutter release through the user input unit 207.

In addition, the cameral control unit 209 may transmit command signals, which are used to control the lens control unit 111 to detect the lens information, to the lens 100. In this case, the lens control unit 111 detects the lens information in response to the command signals and transmits the detected lens information to the camera control unit 209.

The camera control unit 209 may obtain the transmitted lens information.

FIG. 2 is a block diagram of the camera control unit 209 of the electronic apparatus 1, according to an embodiment.

As illustrated in FIG. 2, the camera control unit 209 may include an analog/digital (A/D) conversion unit 220, a digital signal processor 221, a data compression and decompression unit 222, a display controller 223, a CPU 224, a memory controller 225, an audio controller 226, a storage/reading control unit 227, a power control unit 228, a main bus 229, etc.

The CPU 224 generally controls operations of each component of the camera control unit 209. In the case of the electronic apparatus 1 of FIG. 1, the CPU 224 communicates with the lens 110.

The camera control unit 209 transmits commands and data to each component through the main bus 229.

The A/D conversion unit 220 converts analog data that is output from the imaging device 204 into digital data. According to features of the imaging device 204 (e.g., providing a digital output), the A/D conversion unit 220 may be omitted.

The digital signal processor 221 reduces noise in input image data and may perform digital signal processing such as gamma correction, color filter array interpolation, color matrix, color correction, color enhancement, or white balance adjustment.

The digital signal processing will be described below in detail with reference to FIG. 3.

The data compression and decompression unit 222 compresses and decompresses the image data on which digital signal processing is performed. In the case of compression of the image data, the image data is compressed in a compression format such as a Joint Photographic Experts Group (JPEG) or H.264. Image files including image data generated through a compression process are transmitted to a storage medium 212 and then stored, via the storage/reading control unit 227.

The storage/reading control unit 227 stores the image data in the storage medium 212 automatically or according to signals input by the user.

For example, the storage/reading control unit 227 reads data with regard to images from the image files that are stored in the storage medium 212 and inputs the data to the display controller 223 through the memory 210 or other paths in order to display the images on the display unit 206.

The storage medium 212 may be detachably installed in the electronic apparatus 1.

The display controller 223 controls an image output through which an image is displayed on a display screen, for example, a liquid crystal display (LCD) 202 of the EVF 201, the display unit 206, etc.

The memory controller 225 controls the memory 210 that temporarily stores data such as images captured by the electronic apparatus 1 or image-related information, and the audio controller 226 controls a microphone or a speaker 211.

The power control unit 228 controls power use of the electronic apparatus 1 and provides power to the lens 100.

Figure 3:
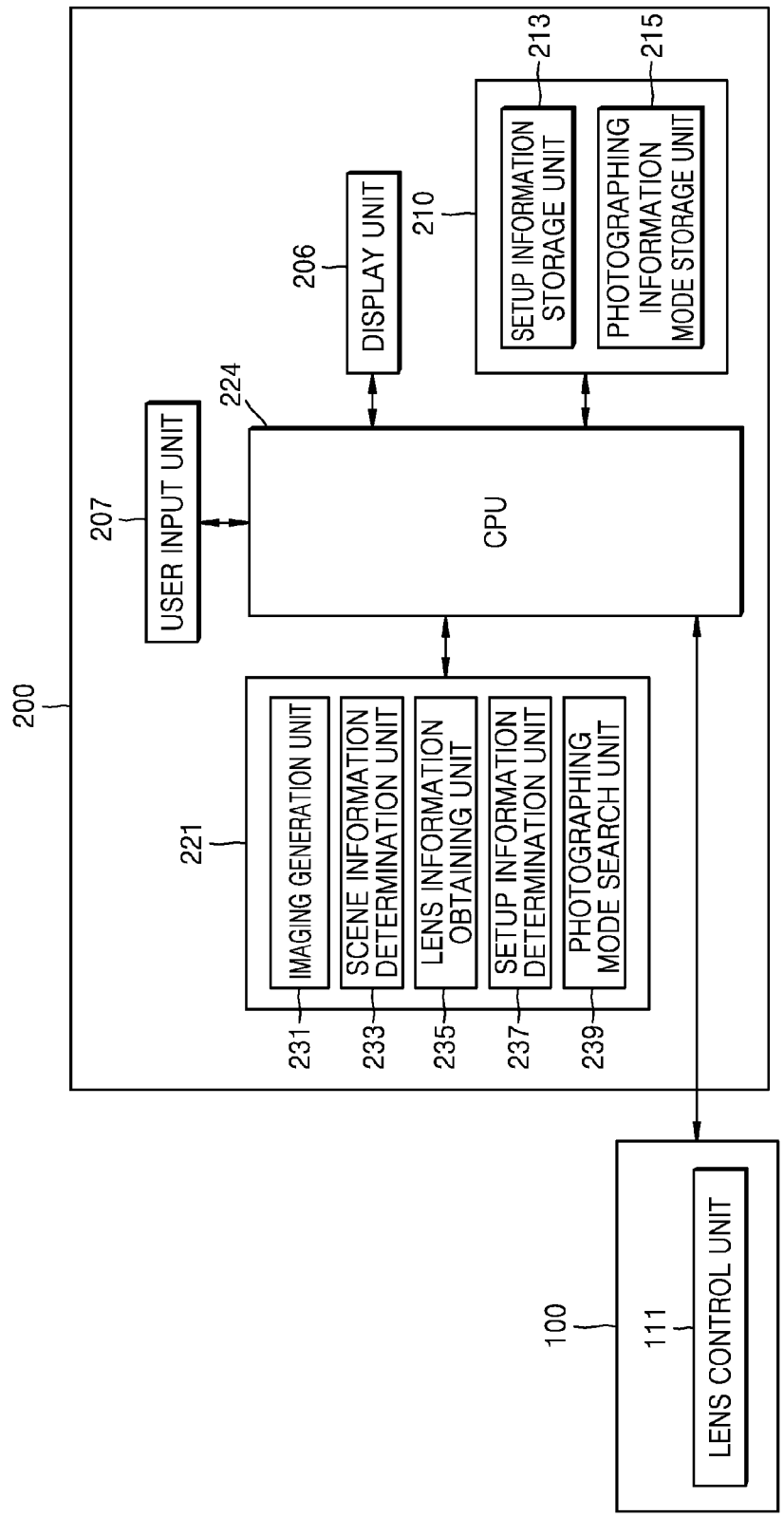
FIG. 3 is a block diagram of a digital signal processor of the electronic apparatus of FIG. 1, according to an embodiment.

FIG. 3 is a block diagram of the digital signal processor 221 of the electronic apparatus 1, according to an embodiment.

As illustrated in FIG. 3, the digital signal processor 221 may include an image generation unit 231, a scene information determination unit 233, a lens information obtaining unit 235, a setup information determination unit 237, and a photographing mode search unit 239.

Also, the memory 210 may include a setup information storage unit 213 and a photographing mode storage unit 215.

Hereinafter, the components will be explained in sequence.

The image generation unit 231 may generate input images.

The image generation unit 231 generates input images by performing at least one of noise reduction processing, gamma correction processing, color filter array interpolation, color matrix, color correction or color enhancement for image data that is input through the A/D conversion unit 220.

The input images are images displayed on the display unit 206 of the electronic apparatus 1. For example, the input image may be a preview image or an image stored in the storage medium 212. The input images may be manually input through manipulation of the user or may be input by a web server through a network (not shown).

The scene information determination unit 233 may determine scene information by recognizing scenes in the input images generated by the image generation unit 231.

For example, the scene information determination unit 233 recognizes scenes such as a landscape and a person (e.g., a portrait scene) from the input images generated by the image generation unit 231. Edges are extracted by applying high-frequency filters to the input images and scenes may be recognized by checking locations and sizes of the subject included in results of edge extraction. Also, scenes such as a landscape and a person may be recognized by using a histogram distribution of a channel of each input image, color information on color spaces, etc. However, a method of recognizing the scenes is not limited thereto.

For example, a landscape-oriented scene may include an outdoor landscape, a night view, a backlit scene without a person, etc. Other scenes may include a portrait scene in which a person is a subject, a night scene in which a person is a subject at night, a backlit scene in which a person is a subject in a backlight condition, a macro scene in which a subject is close to the imaging device 204, a macro text in which a short-distance text message is a subject, etc.

The lens information obtaining unit 235 may obtain the lens information related to the lens 100 of the electronic apparatus 1.

For example, the lens 100 is separable from the main body 200 of the electronic apparatus 1, and the lens control unit 111 of the lens 100 may store the lens information corresponding to features of the lens 100. In this case, the lens information may include at least one of aperture information, focal distance information, information about whether 3D images are taken, aperture shape information, or distortion correction information, but is not limited thereto.

The camera control unit 209 may transmit command signals, which control the lens control unit 111 to detect the lens information, to the lens 100. The lens control unit 111 detects the lens information in response to the command signals and may transmit the detected lens information to the camera control unit 209.

Also, the lens information is detected by the lens control unit 111 and transmitted to the main body 200 when the electronic apparatus 1 is turned on or when there is a change in the lens 100 that is separable from the main body 200 of the electronic apparatus 1.

The lens information obtaining unit 235 may obtain the lens information.

The setup information determination unit 237 may determine the setup information by using the scene information determined by the scene information determination unit 233 and the lens information obtained by the lens information obtaining unit 235.

For example, the setup information may include setup lists with regard to photographing conditions and setup values corresponding to the setup lists.

In this regard, the photographing conditions may include at least one of white balance, exposure value compensation (EVC), color correction, flash light amount adjustment, sensitivity adjustment, aperture adjustment, or shutter speed adjustment, but are not limited thereto.

The photographing mode search unit 239 may search for (e.g., select) one or more photographing modes based on the setup information determined by the setup information determination unit 237.

For example, a photographing mode including the setup information may be found.

In a conventional electronic apparatus, a photographing mode having an out of focus effect is provided when a person is recognized after a face of the person is detected in a scene of an input image. In this case, when a person is photographed by using a telephoto lens of which a depth of field is small, the out of focus effect is achieved. However, when a person is photographed by using a wide angle lens of which a depth of field is great, the out of focus effect may be less effective.

The electronic apparatus 1 recognizes scenes in the input images and may also provide a photographing mode based on the features of the lens 100 of the electronic apparatus 1.

For example, the electronic apparatus 1 may display a photographing mode having the out of focus effect when a person is recognized in the input image and photographed by using the telephoto lens. On the contrary, when a person is photographed by using the wide angle lens, the electronic apparatus 1 may not display a photographing mode having the out of focus effect because the out of focus effect may not be suitably effective.

Accordingly, the electronic apparatus 1 may set the photographing conditions based on the features of the lens 100 and the subject's state that is related to the scene of the input images.

Thus, the user may photograph the subject under the photographing condition that is suitable for a photographing state by using the photographing mode that is displayed based on the features of the lens 100 and the subject's state.

Capturing the subject by using the displayed photographing mode will be explained in detail with reference to FIGS. 5 through 7.

The memory 210 may store a program for processing and controlling the CPU 224 and input/output data.

The memory 210 may include at least one storage medium from a flash memory-type storage medium, a hard disk-type memory, a multimedia micro-type memory, a card-type memory (e.g., a secure digital (SD) memory, extreme digital (XD) memory, etc.), random access memory (RAM), static random access memory (SRAM), read-only memory (ROM), electrically erasable programmable read-only memory (EEPROM), programmable read-only memory (PROM), a magnetic memory, a magnetic disk, or an optical disk.

Programs stored in the memory 210 may be classified into a plurality of modules, depending on functions. For example, the programs may be classified into a user interface (UI) module (not shown), a touch screen module (not shown), etc.

The UI may provide a specialized UI, graphical user interface (GUI), etc. that are synchronized with the electronic apparatus 1. Functions of the UI will be apparent to one of ordinary skill in the art from a name of the UI, and thus detailed descriptions thereof will be omitted.

For example, by providing the electronic apparatus 1 with a UI through which the user may select a photographing mode based on features of a subject in an input image and the features of the lens 100, the user may more easily and quickly view various photographing modes.

The touch screen module detects the touch gestures of the user on the touch screen and may transmit information about the touch gesture to the CPU 224. The touch screen module may be a separate controller (e.g., a hardware controller).

For example, the touch gestures of the user may be a tap gesture, a touch & hold gesture, a double tap gesture, a drag gesture, a panning gesture, a flick gesture, a drag & drop gesture, a swipe gesture, or the like.

The setup information storage unit 213 may store the setup information used to search for the photographing modes.

For example, the setup information may include setup lists related to the photographing conditions determined by using the scene information and the lens information and setup values corresponding to the setup lists.

In this case, the photographing conditions may include at least one of white balance, EVC, color correction, flash light amount adjustment, sensitivity adjustment, aperture adjustment, and shutter speed adjustment, but are not limited thereto.

The electronic apparatus 1 may display the photographing modes by recognizing scenes in the input image and considering the features of the lens 100 of the electronic apparatus 1.

For example, the electronic apparatus 1 may display a photographing mode having the out of focus effect when a person is recognized in an input image and photographed by using a telephoto lens. However, when the person is photographed by using a wide angle lens, the electronic apparatus 1 may not display the photographing mode having the out of focus effect because the out of focus effect may hardly work.

Accordingly, the electronic apparatus 1 may set the photographing conditions based on the features of the lens 100 and the subject's state that is related to the scene of the input images.

The photographing mode storage unit 215 may store the photographing mode when user interaction for inputting settings needs to be minimized and images need to be photographed quickly and easily according to a desired use.

For example, the photographing modes may include various modes such as an auto mode used to minimize the user interaction for inputting settings and quickly and conveniently capture images according to the purpose of use, a scene mode used to briefly and optimally set a camera according to the photographing state or the subject's state, an effect mode used to apply special effects on image capturing such as continuous photographing and scene photographing, and an aperture priority, shutter priority or manual (A/S/M) mode used to capture images by manually setting diverse functions, for example, adjustment of an size of the aperture, shutter speed, etc.

In this case, the photographing mode may be a photographing setting mode programmed in the electronic apparatus 1. Also, the photographing mode may be generated by using the UI provided in the electronic apparatus 1 and by setting the setup lists related to the photographing conditions based on the manipulation of the user and the setting values corresponding to the setup lists.

The photographing mode search unit 239 may obtain the setup information set by the setup information determination unit 237 from the setup information storage unit 213 and may search for the photographing modes in the photographing mode storage unit 215 by using the obtained setup information.

Operations of the electronic apparatus 1 will be explained in detail.

Figure 4:
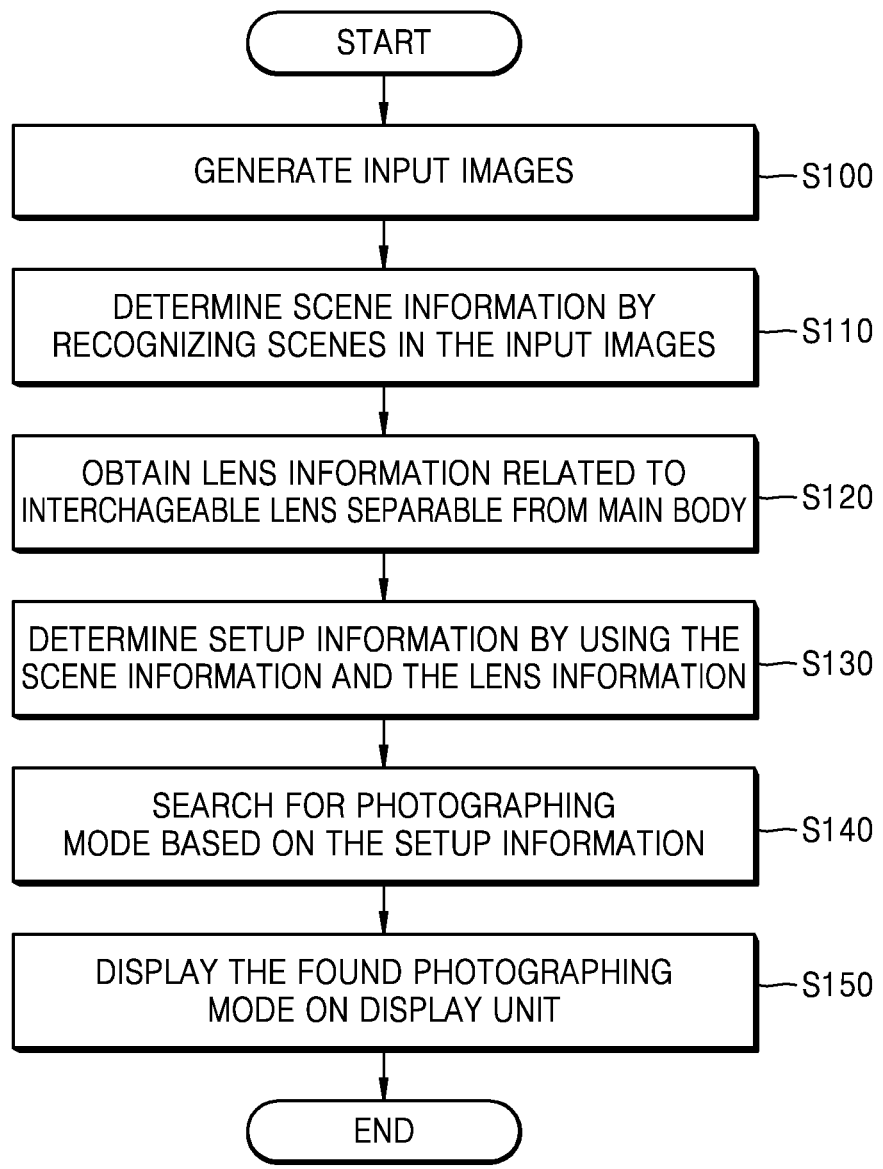
FIG. 4 is a flowchart of a method of displaying a photographing mode by using lens information and scene information, according to an embodiment.

FIG. 4 is a flowchart of a method of displaying a photographing mode by using the lens information and the scene information, according to an embodiment.

In operation S100, the electronic apparatus 1 generates input images.

For example, the input images may include images generated by performing at least one imaging signal process such as noise reduction, gamma correction, color filter array interpolation, color matrix, color correction, or color enhancement.

Also, the input images are images displayed on the display unit 206 of the electronic apparatus 1. For example, the input images may be preview images or images stored in the storage medium 212. Also, the input images may be manually input by manipulation of the user or by a web server through a network.

In operation S110, the electronic apparatus 1 recognizes scenes in the input images generated in operation S100 and determines scene information.

For example, scenes such as a landscape or a portrait may be recognized in the input images generated in operation S100.

For example, edges are extracted by applying a high-frequency pass filter to the input images, and the scenes may be recognized by checking a location or a size of the subject based on results of edge extraction. In addition, the scenes such as a landscape and a portrait may be recognized by using a histogram distribution of a channel of each input image, color information on color spaces, etc. However, a method of recognizing the scenes is not limited thereto.

In operation S120, the electronic apparatus 1 obtains the lens information related to the lens 100 thereof.

For example, the lens 100 is separable from the main body 200 of the electronic apparatus 1, and the lens control unit 111 of the lens 100 may store the lens information corresponding to the features of the lens 100. In this case, the lens information includes at least one of aperture information, focal distance information, information about whether 3D images are taken, aperture shape information, and distortion correction information, but is not limited thereto.

Also, the lens information is detected by the lens control unit 111 and transmitted to the main body 200 when the electronic apparatus 1 is turned on or there is a change in the lens 100 that is separable from the main body 200 of the electronic apparatus 1, or when the electronic apparatus 1 receives a command signal for controlling the lens control unit 111 to detect the lens information from the camera control unit 209.

The lens information obtaining unit 235 may obtain the lens information transmitted from the lens control unit 111 to the main body 200.

In operation S130, the electronic apparatus 1 may determine the setup information by using the scene information determined in operation S110 and the lens information obtained in operation S120.

For example, the setup information may include the setup lists related to the photographing conditions and the setup values corresponding to the setup lists.

In this regard, the photographing conditions may include at least one of white balance, EVC, color correction, flash light amount adjustment, sensitivity adjustment, aperture adjustment, or shutter speed adjustment, but are not limited thereto.

The setup information may be used to search for the photographing modes and may be stored in the memory 210 of the electronic apparatus 1.

In operation S140, the electronic apparatus 1 searches for the photographing modes based on the setup information determined in operation S130.

For example, one or more photographing modes including the setup information determined in operation S130 may be found during the search.

For example, the photographing mode is used to minimize the user interaction to input settings and to capture images quickly and conveniently, and thus may be stored in the memory 210 of the electronic apparatus 1.

In this case, the photographing mode may be included in the photographing setup information programmed in the electronic apparatus 1. Also, the photographing mode may be generated by using the UI provided in the electronic apparatus 1 and setting the setup lists related to the photographing conditions based on the manipulation of the user and the setup values corresponding to the setup lists.

The electronic apparatus 1 may recognize the scenes in the input images and may display the photographing modes based on the scenes in the input images and the features of the lens 100 of the electronic apparatus 1.

For example, the electronic apparatus 1 may display a photographing mode having the out of focus effect when a person is recognized in the input image and photographed by using the telephoto lens. On the contrary, when a person is photographed by using the wide angle lens, the electronic apparatus 1 may not display a photographing mode having the out of focus effect because the out of focus effect may not work effectively.

Accordingly, the electronic apparatus 1 may set the photographing conditions based on the features of the lens 100 and the subject's state that is related to the scene of the input images.

Thus, the user may photograph the subject under the photographing condition that is suitable for a photographing state based on the features of the lens 100 and the subject's state and using the displayed photographing mode.

In operation S150, the electronic apparatus 1 may display the photographing modes found in operation S140 on the display unit 206 of the electronic apparatus 1.

For example, at least one photographing mode selectable by the user may be displayed along with the input images.

Figure 5:
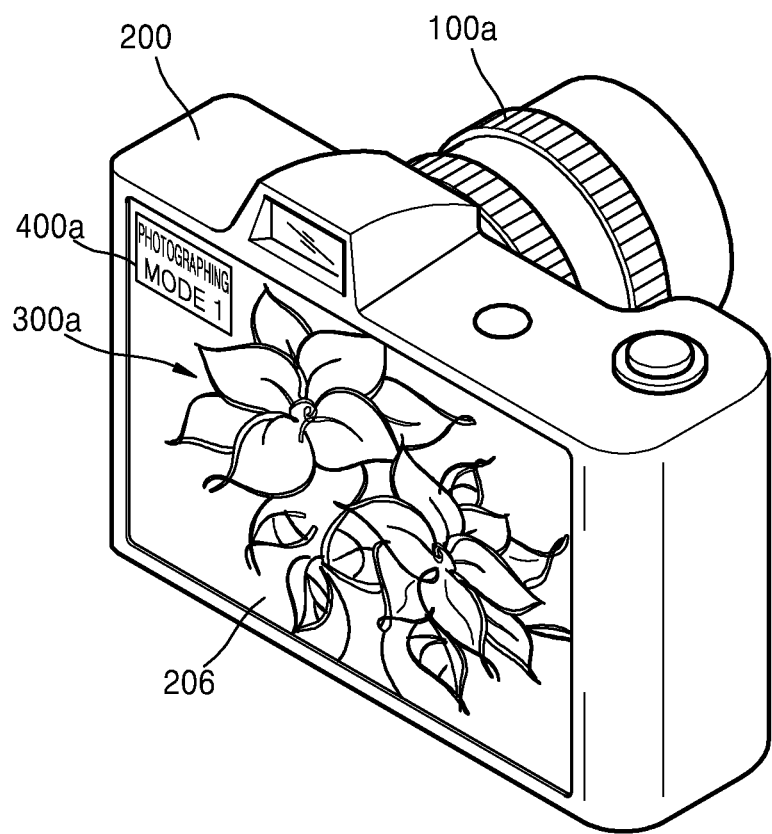
FIGS. 5 through 7 are examples of a method of displaying photographing modes by using an electronic apparatus based on various pieces of lens information and scene information, according to embodiments.
Figure 6:
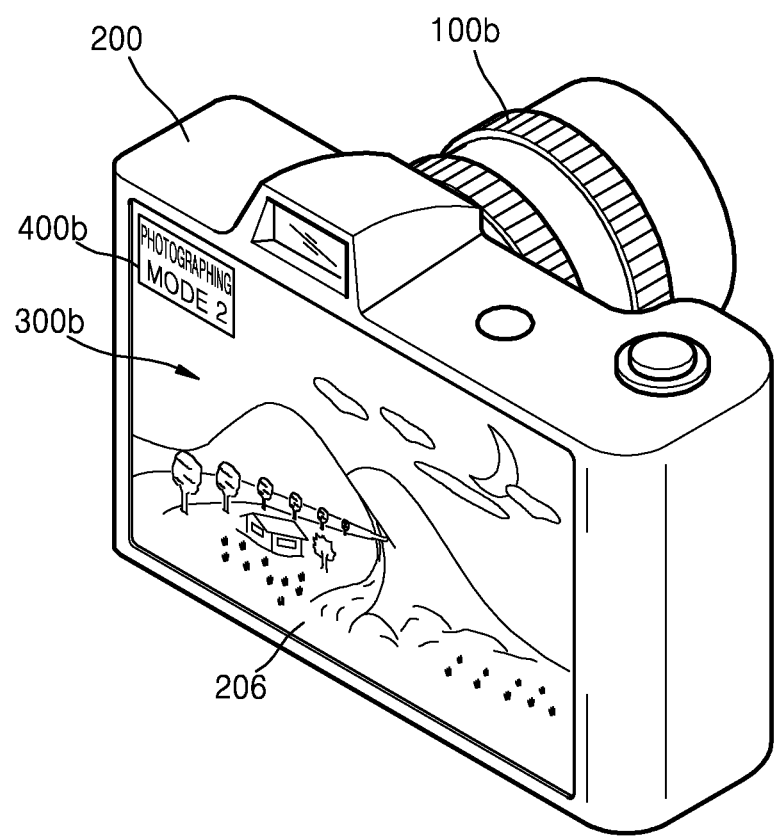
Figure 7:
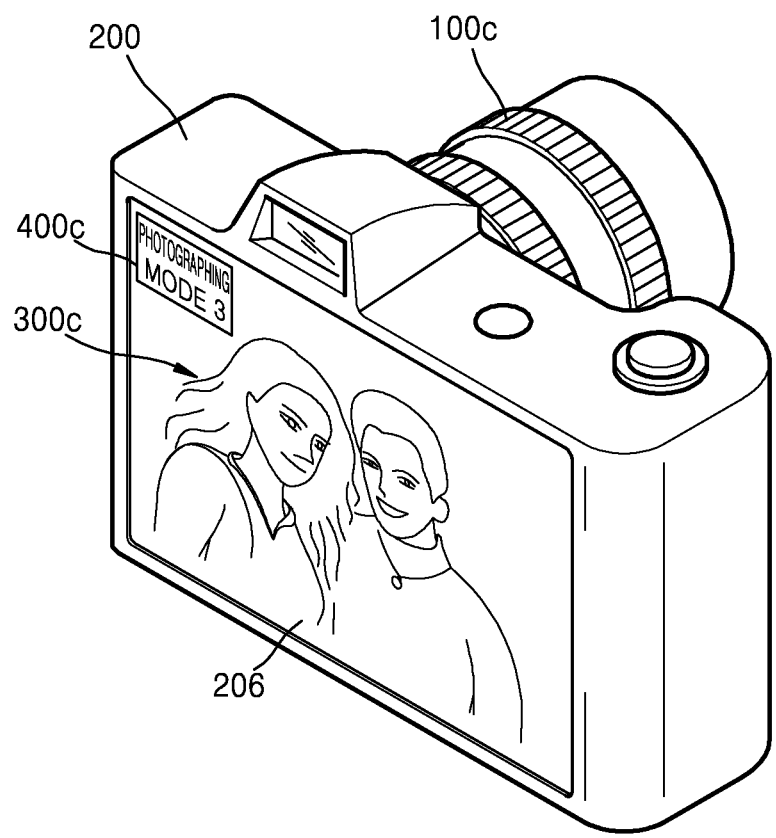

FIGS. 5 through 7 are examples of a method of displaying photographing modes by using the electronic apparatus 1 based on various pieces of lens information and scene information, according to various embodiments.

As illustrated in FIGS. 5 through 7, photographing modes 400*a*, 400*b* and 400*c* displayed on the display unit 206 may vary according to features of lenses 100*a*, 100*b* and 100*c* installed in the main body 200 of the electronic apparatus 1 and scenes recognized in input images 300*a*, 300*b* and 300*c* displayed on the display unit 206 of the electronic apparatus 1.

For example, the lenses 100*a*, 100*b* and 100*c* may include a wide-angle lens, a standard lens, a telephoto lens, etc.

The wide-angle lens has a short focal distance and a wide angle of view. Thus, it is possible to photograph a wide range of areas, but a size of a subject is small and a perspective of an image is exaggerated.

Also, by using the wide-angle lens, a single image may include a wide range of a landscape. For example, when the user views a landscape of streets and photographs a certain person with the wide-angle lens, a size of the person in an image appears much smaller than an actual size of the person. However, a whole landscape, including all objects, buildings, etc. around the person, may be included in one image. That is, when a subject is photographed by using the wide-angle lens, an image having a pan-focusing effect may be captured.

The standard lens means a lens having an angle of view that makes a size of a subject shown in an image appear similarly to an actual size of the subject. When the subject is photographed through the standard lens, the size of the photographed subject is similar to the actual size of the subject. In addition, the angle of view of the captured image may be the most natural look of a person at a certain place.

The telephoto lens has a long focal distance and a narrow angle of view. Accordingly, when a subject is photographed by using the telephoto lens, the subject in the distance appears close up when photographed. However, the angle of view is narrow, and thus a small range of a landscape may be photographed.

When the subject appears close up and photographed by using the telephoto lens, details of the subject may be readily visible in an image. However, since the angle of view is narrow, illustrations of a location of the subject or backgrounds may be limited. That is, when the subject is photographed by using the telephoto lens, an image having the out of focus effect may be captured. As illustrated in FIG. 5, the electronic apparatus 1 photographs a subject that is close to the imaging device 204 and displays the input image 300*a* on the display unit 206.

In a conventional electronic apparatus, a photographing mode having a pan-focusing effect may be displayed in a case where it is recognized that the subject, which is close to the imaging device 204, is photographed in a scene recognized in the input image 300*a*.

In this case, if the electronic apparatus 1 photographs the subject close to the imaging device 204 by using the standard lens or the wide-angle lens having a great depth of field, the pan-focusing effect may be effective.

On the contrary, if the lens 100 is the telephoto lens having a long focal distance and a narrow angle of view, although the electronic apparatus 1 photographs the subject close to the imaging device 204, the pan-focusing effect may not be effective. In this case, the electronic apparatus 1 may search for the photographing mode 400*a* having a high aperture value and may display a found (e.g., selected) photographing mode 400*a* for the user. Therefore, the electronic apparatus 1 may capture an image having a greater depth of field by adjusting the aperture value even though the subject is close to the imaging device 204 and photographed by using the telephoto lens having the narrow angle of view.

As illustrated in FIG. 6, the electronic apparatus 1 may display the input image 300*b* in which a focus of the subject is in the distance on the display unit 206.

In a conventional electronic apparatus, a photographing mode having the pan-focusing effect is displayed for the input image 300*b* in which a focus of a subject is in the distance.

In this case, when the electronic apparatus 1 photographs a landscape by using the standard lens or the wide-angle lens having the great depth of field, the pan-focusing effect may work.

On the contrary, when the electronic apparatus 1 photographs a landscape by using the telephoto lens having the long focal distance and the narrow angle of view, the pan-focusing effect may not be effective. In this case, the electronic apparatus 1 may search for the photographing mode 400b in which the chroma of green color, which is shown in the input image 300b, is emphasized and may display the found photographing mode 400b for the user. Accordingly, the electronic apparatus 1 may capture an image in which overall colors are clear by adjusting the chroma of colors even though the electronic apparatus 1 uses the telephoto lens having the narrow angle of view.

As illustrated in FIG. 7, the electronic apparatus 1 may display the input image 300c including a person on the display unit 206.

In a conventional electronic apparatus, when a face of a person is first detected in a scene included in an input image and the person is recognized, a photographing mode having the out of focus effect may be displayed.

In this case, the electronic apparatus 1 may have an out of focus effect when the person is photographed by using a telephoto lens having a small depth of field.

On the other hand, when the lens 100c is a standard lens or a wide-angle lens having a short focal distance and a wide angle of view, the electronic apparatus 1 may not have the out of focus effect even though the electronic apparatus 1 photographs the person. In this case, since the electronic apparatus 1 may not have the out of focus effect, a photographing mode having the out of focus effect is not displayed and the photographing mode 400c in which a facial color included in the input image 300c is corrected is searched for to display the same for the user. Accordingly, the electronic apparatus 1 corrects a facial color even when the wide-angle lens having a great angle of view is used to photograph a person. Thus, the electronic apparatus 1 may capture an image in which a facial color of a person is clear instead of having the out of focus effect.

An apparatus according to one or more embodiments may include a processor, a memory for storing and implementing program data, a permanent storage device such as a disk drive, user interface devices such as a touch panel, a key, buttons, etc.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

What is claimed is:

1. A method of displaying a photographing mode, the method comprising:
    generating input images;
    determining scene information by recognizing scenes in the input images;
    obtaining lens information related to a lens of an electronic apparatus when the electronic apparatus is turned on or when there is a change in the lens attached to the electronic apparatus, wherein the lens information comprises at least one of aperture information, focal distance information, information about whether three-dimensional (3D) images are taken, aperture shape information, or distortion correction information;
    determining setup information by using both the scene information and the lens information to determine a list of setup values of photographing conditions which comprises at least one of white balance, exposure value compensation (EVC), color correction, flash amount adjustment, sensitivity adjustment, aperture adjustment, or shutter speed adjustment;
    searching for a photographing mode of the electronic apparatus which comprises the determined setup information; and
    displaying the searched photographing mode on a display unit of the electronic apparatus.

2. The method of claim 1, wherein the displaying of the selected photographing mode on the display unit further comprises displaying at least one photographing mode selectable by a user together with the input images.

3. An electronic apparatus comprising:
    an image generation unit that generates input images;
    a scene information determination unit that determines scene information by recognizing scenes in the input images;
    a lens information obtaining unit that obtains lens information about a lens of the electronic apparatus when the electronic apparatus is turned on or when there is a change in the lens attached to the electronic apparatus, wherein the lens information comprises at least one of aperture information, focal distance information, information about whether three-dimensional (3D) images are taken, aperture shape information, or distortion correction information;
    a setup information determination unit that determines setup information by using both the scene information and the lens information to determine a list of setup values of photographing conditions which comprises at least one of white balance, exposure value compensation (EVC), color correction, flash amount adjustment, sensitivity adjustment, aperture adjustment, or shutter speed adjustment;
    a photographing mode search unit that searches for a photographing mode of the electronic apparatus based on the determined setup information; and
    a display unit that displays the searched photographing mode.

4. The electronic apparatus of claim 3, wherein the display unit displays at least one photographing mode selectable by a user together with the input images.

5. A non-transitory computer-readable storage medium having written thereon computer program codes, which when executed by a processor, performs a method of displaying a photographing mode, the method comprising:
    generating input images;
    determining scene information by recognizing scenes in the input images, wherein scenes are recognized by checking a location or a size of a subject based on results of edge extraction, or by using a histogram distribution of a channel of each input image or of color information on color spaces;
    obtaining lens information related to a lens of an electronic apparatus when the electronic apparatus is turned on or when there is a change in the lens attached to the electronic apparatus;
    determining setup information by using both the scene information and the lens information to determine a list of setup values of photographing conditions which comprises at least one of white balance, exposure value compensation (EVC), color correction, flash amount adjustment, sensitivity adjustment, aperture adjustment, or shutter speed adjustment;
    searching for a photographing mode of the electronic apparatus which comprises the determined setup information; and
    displaying the searched photographing mode on a display unit of the electronic apparatus.

6. The non-transitory computer-readable storage medium of claim 5, wherein the displaying of the found photographing mode on the display unit further comprises displaying at least one photographing mode selectable by a user together with the input images.

* * * * *